US012654925B2

(12) United States Patent
Egan

(10) Patent No.: US 12,654,925 B2
(45) Date of Patent: Jun. 16, 2026

(54) STORAGE CONTAINER

(71) Applicant: Martin Shawn Egan, Ballwin, MO (US)

(72) Inventor: Martin Shawn Egan, Ballwin, MO (US)

( * ) Notice: Subject to any disclaimer, the term of this patent is extended or adjusted under 35 U.S.C. 154(b) by 0 days.

(21) Appl. No.: 18/920,948

(22) Filed: Oct. 20, 2024

(65) Prior Publication Data

US 2025/0042641 A1     Feb. 6, 2025

Related U.S. Application Data

(62) Division of application No. 18/121,982, filed on Mar. 15, 2023, now Pat. No. 12,492,062.

(Continued)

(51) Int. Cl.
B65D 6/24          (2006.01)
B65D 6/08          (2006.01)
(Continued)

(52) U.S. Cl.
CPC ........... B65D 81/3813 (2013.01); B65D 7/16 (2013.01); B65D 7/24 (2013.01); B65D 43/22 (2013.01); B65D 43/24 (2013.01); B65D 51/04 (2013.01); B65D 55/14 (2013.01); B60R 9/065 (2013.01); B60R 2011/004 (2013.01)

(58) Field of Classification Search
CPC ........ B65D 81/3813; B65D 7/16; B65D 7/24; B65D 43/22; B65D 43/24; B65D 51/04; B65D 55/14; B65D 7/28; B65D 43/16; B65D 43/163; B65D 11/1866–1886; B65D 1/225; B65D 11/18; B60R 9/065;
(Continued)

(56) References Cited

U.S. PATENT DOCUMENTS 3,809,278 A * 5/1974 Csumrik .................. B65D 7/30
                                                                217/69
4,044,910 A   8/1977 Box
                     (Continued)

FOREIGN PATENT DOCUMENTS

WO      WO-2013097469 A1 * 7/2013  ............. B65D 90/08

OTHER PUBLICATIONS

English translation of WO-2013097469-A1 (Year: 2013).*

*Primary Examiner* — Jun S Yoo
(74) *Attorney, Agent, or Firm* — David E. Crawford; Fast Forward Law, LLC

(57)          ABSTRACT

A storage container including a frame surrounding an interior having primary and secondary openings, a lid assembly mounted adjacent the primary opening, and a bottom panel selectively attached to the frame adjacent the secondary opening. The container has a front panel, a back panel, and a pair of end panels. The frame interior is sized to receive the front panel, the back panel, and the end panels. The front panel, the back panel, and the pair of end panels are configured for selective attachment to the frame surrounding the secondary opening when the bottom panel is detached from the frame. The bottom panel is configured for simultaneous selective attachment to the front panel, the back panel, and the pair of end panels opposite the secondary opening when the front panel, the back panel, and the pair of end panels are attached to the frame surrounding the secondary opening.

19 Claims, 16 Drawing Sheets

Related U.S. Application Data

(60) Provisional application No. 63/324,154, filed on Mar. 28, 2022.

(51) Int. Cl.

| | |
|---|---|
| *B65D 6/16* | (2006.01) |
| *B65D 43/22* | (2006.01) |
| *B65D 43/24* | (2006.01) |
| *B65D 51/04* | (2006.01) |
| *B65D 55/14* | (2006.01) |
| *B65D 81/38* | (2006.01) |
| *B60R 9/06* | (2006.01) |
| *B60R 11/00* | (2006.01) |

(58) Field of Classification Search
CPC ... B60R 2011/004; B60R 11/06; B62B 3/025; B62B 2205/006
See application file for complete search history.

(56) References Cited

U.S. PATENT DOCUMENTS

| | | | | |
|---|---|---|---|---|
| 4,630,747 | A | * | 12/1986 | Chiang ................. B65D 11/18 217/15 |
| 5,865,334 | A | | 2/1999 | Ruiz et al. |
| 6,151,933 | A | | 11/2000 | Lentini |
| 6,209,739 | B1 | | 4/2001 | Samsel |
| 6,334,560 | B1 | | 1/2002 | Lentini |
| 6,830,167 | B2 | | 12/2004 | Schomaker |
| 7,350,817 | B2 | | 4/2008 | Jurik et al. |
| 7,731,026 | B2 | | 6/2010 | Harrison |
| 9,151,078 | B2 | | 10/2015 | Lackey |
| 9,260,063 | B2 | | 2/2016 | Zaiser et al. |
| 9,314,919 | B2 | | 4/2016 | Harrison |
| 9,586,533 | B2 | | 3/2017 | Harrison |
| 10,625,687 | B1 | | 4/2020 | Todd et al. |
| 11,085,206 | B2 | | 8/2021 | Harrison |
| 11,130,444 | B2 | | 9/2021 | Oh |

* cited by examiner

STORAGE CONTAINER

CROSS-REFERENCE TO RELATED APPLICATION

This is a divisional application claiming benefit of co-pending U.S. patent application Ser. No. 18/121,982 now entitled, "METHOD OF RECONFIGURING A STORAGE CONTAINER" filed Mar. 15, 2003, which claimed benefit of U.S. Provisional Patent Application No. 63/324,154 entitled, "Locking Box with Shipping Configuration" filed Mar. 28, 2022, both of which are hereby incorporated by reference in their respective entireties.

BACKGROUND

The present disclosure is directed to a storage container and more particularly to a storage container having a compact shipping configuration.

Locking boxes, or more broadly storage containers, have been added to trucks and boats as accessories, as well as used on decks, docks, jobsites, and other applications to store equipment, protect the contents from theft and weather. These storage containers usually include a tub having an opening and a lid or cover assembly pivotally attached to the tub for selectively covering the opening of the tub. In many instances, the tub is oriented with the opening at a top of the tub. In other instances, such as when the container is mounted along a side of a truck, the tub may be oriented with the opening along a side of the tub, frequently facing outward from the truck.

Most storage containers feature lockable latch mechanisms for securing the lid assembly to limit access to container contents. Often the latch mechanisms include a pivotable hook-shaped latch positioned inside the tub near its opening. Usually, the latch is biased to engage a post or striker mounted on the lid assembly to prevent it from opening. A linkage or connector mechanism operatively connects a paddle or handle mounted outside the tub to the latch so that when a user rotates the paddle, the linkage moves the latch to release the striker and allow the lid assembly to open. The latch mechanisms frequently include a lock cylinder mounted adjacent the paddle. When a user inserts and turns a key in the lock cylinder, a cam mounted on the cylinder pivots to alternatively permit or prevent the latch from moving. Usually, one latch mechanism is mounted adjacent each end of long storage containers. The linkages of the latch mechanisms are coupled with a rod such that rotating the paddle of either latch mechanism moves the latch of both. Thus, a user can open the lid assembly from either end of the storage container. However, the components of the joined latch mechanisms are subject to misalignment and often require ongoing adjustment due to fastener slippage, wear, temperature changes, and stacked tolerances inherent in multicomponent systems. As those skilled in the art will appreciate these effects are amplified on larger containers. Another disadvantage of joined multi-component latch mechanisms is their complexity adds assembly time.

Some truck boxes have had electronic locks powered by a vehicle battery. These electronic locks become nonoperational when the battery is drained. Generally no provisions are made to maintain battery charge, particularly when the vehicle is stored for extended periods. Aftermarket electronic locks usually attach to the rod coupling the latch mechanisms and are subject to the misalignment and ongoing adjustment problems noted above.

Another problem with known storage containers is that their contents can be difficult to see, particularly in low light. Locating a particular tool stored in the container or a small part dropped near the container can be challenging. Often users must locate a light to find these items. Some current truck boxes have had interior lighted power by vehicle batteries and some users have resorted to mounting battery powered lights in the truck boxes to enable them to see inside the container.

Another disadvantage of known storage containers results directly from their size. Shipping costs vary by package weight and volume. Some larger truck boxes have lengths of 96 inches, resulting in high shipping costs. Even smaller containers having lengths of 24 inches can take significant space when transported in bulk. In addition to shipping cost, the size of storage containers make them more difficult to handle increasing likelihood of container damage in transit. Although packaging can reduce damage in transit, larger containers require more packaging materials, which adds expense. More packaging also increases overall shipping weight and volume. Container size also affects space requirements needed to warehouse, stock, and display the containers.

In view of the numerous disadvantages and drawbacks present in current storage containers, improvements to storage container design are needed.

SUMMARY

In one aspect, the present disclosure includes a storage container for storing equipment. The storage container comprises a frame surrounding a frame interior. The frame has a primary opening providing access to the frame interior and a secondary opening opposite the primary opening. The primary opening has a primary opening length and a primary opening width. The container also includes a lid assembly pivotally mounted on the frame adjacent the primary opening for selective movement between a closed position in which the lid assembly covers the primary opening to block access to the frame interior through the primary opening and an open position in which at least a portion of the lid assembly is separated from the frame allowing access to the frame interior through the primary opening. Further, the storage container has a bottom panel configured for selective attachment to the frame adjacent the secondary opening to block access to the frame interior through the secondary opening. The bottom panel has a bottom panel length and a bottom panel width. In addition, the container comprises a front panel having a front panel length corresponding to the bottom panel length and a front panel width measuring less than the primary opening width, as well as a back panel having a back panel length corresponding to the bottom panel length and a back panel width corresponding to the front panel width. The storage container also includes a pair of end panels. Each end panel of the pair of end panels has an end panel length corresponding to the bottom panel width and an end panel width corresponding to the front panel width. The frame interior is sized to simultaneously receive the front panel, the back panel, and the pair of end panels. Moreover, the front panel, the back panel, and the pair of end panels are configured for selective attachment to the frame surrounding the secondary opening when the bottom panel is detached from the frame such that a first end panel of the pair of end panels is simultaneously attached to the frame adjacent a first end of the secondary opening, to a first end of the front panel, and to a first end of the back panel and a second end panel of the pair of end panels is simultaneously attached to the frame adjacent a second end of the secondary opening opposite the first end of the secondary opening, to a second end of the front panel opposite the first end of the front panel, and to a second end of the back panel opposite the first end of the back panel. The bottom panel is config-ured for simultaneous selective attachment to the front panel, the back panel, and the pair of end panels opposite the secondary opening when the front panel, the back panel, and the pair of end panels are attached to the frame surrounding the secondary opening. Still further, the front panel, the back panel, the pair of end panels, and the bottom panel define a second interior extending continuously with the frame inte-rior when the front panel, the back panel, and the pair of end panels are attached to the frame surrounding the secondary opening.

In another aspect, the present disclosure includes a storage container for storing equipment, comprising a tub having a hollow interior and an opening providing access to the hollow interior. A lid assembly is pivotally mounted on the tub for selective movement between a closed position in which the lid assembly covers the opening to block access to the hollow interior through the opening and an open position in which at least a portion of the lid assembly is separated from the tub allowing access to the hollow interior through the opening; a striker mounted on the lid assembly. The storage container also includes an electric latch assem-bly mounted on the tub for engaging the striker to hold the lid assembly in a closed position. A power supply is posi-tioned in the hollow interior, and a control is mounted inside the tub and operatively connecting the power supply and the electric latch assembly for selectively disengaging the striker to allow the lid assembly to move to the open position when the control receives a signal from a preselected trans-mitter located outside the storage container.

In yet another aspect, the present disclosure includes a storage container for storing equipment, comprising a tub having a hollow interior, an opening providing access to the hollow interior, and a sealing land surrounding the opening. The container also comprises a lid assembly pivotally mounted on the tub for selective movement between a closed position in which the lid assembly covers the opening to block access to the hollow interior through the opening and an open position in which at least a portion of the lid assembly is separated from the tub allowing access to the hollow interior through the opening. The lid assembly includes a frame, a cover mounted on the frame, and an inside panel mounted on the frame opposite the cover. A striker is mounted on the inside panel, and a seal gasket is mounted on a peripheral margin of the inside panel for engaging the sealing land surrounding the opening to pre-vent liquid from passing between the lid assembly and the tub when the lid assembly is in the closed position. In addition, the container includes an electric latch assembly mounted on the tub for engaging the striker to hold the lid assembly in the closed position. A control mounted inside the tub operatively connects the electric latch assembly to a power supply for selectively disengaging the striker to allow the lid assembly to move to the open position when the control receives a signal.

In another aspect, the present disclosure includes a method of reassembling a storage container having a frame surrounding a frame interior where the frame has a primary opening providing access to the frame interior and a sec-ondary opening opposite the primary opening. The container also has a lid assembly pivotally mounted on the frame adjacent the primary opening for selective movement between a closed position in which the lid assembly covers the primary opening to block access to the frame interior through the primary opening and an open position in which at least a portion of the lid assembly is separated from the frame allowing access to the frame interior through the primary opening. The container has a bottom panel selec-tively attached to the frame adjacent the secondary opening to block access to the frame interior through the secondary opening. Additionally, the container includes a front panel, a back panel, and a pair of end panels. The frame interior being sized to simultaneously receive the front panel, the back panel, and the pair of end panels. The method com-prises the steps of moving the lid assembly to the open position and removing the front panel, the back panel and the pair of end panels from the frame interior through the frame opening. The method also comprises detaching the bottom panel from the frame to expose the secondary opening and attaching the front panel, the back panel, and the pair of end panels to the frame surrounding the second-ary opening when the bottom panel is detached from the frame. A first end panel of the pair of end panels is simultaneously attached to the frame adjacent a first end of the secondary opening, to a first end of the front panel, and to a first end of the back panel, and a second end panel of the pair of end panels is simultaneously attached to the frame adjacent a second end of the secondary opening opposite the first end of the secondary opening, to a second end of the front panel opposite the first end of the front panel and to a second end of the back panel opposite the first end of the back panel. The method further includes attaching the bot-tom panel to the front panel, the back panel, and the pair of end panels opposite the secondary opening.

In still another aspect, the present disclosure includes a method of configuring a storage container having a frame surrounding a frame interior. The frame has a primary opening providing access to the frame interior and a sec-ondary opening opposite the primary opening. The frame also includes a lid assembly pivotally mounted on the frame adjacent the primary opening for selective movement between a closed position in which the lid assembly covers the primary opening to block access to the frame interior through the primary opening and an open position in which at least a portion of the lid assembly is separated from the frame allowing access to the frame interior through the primary opening. Further, the storage container includes a front panel, a back panel opposite the front panel, and a pair of end panels attached to the frame surrounding the second-ary opening, and a bottom panel selectively attached to the front panel, the back panel, and the pair of end panels opposite the secondary opening. The method comprises the steps of detaching the bottom panel from the bottom panel from the front panel, the back panel, and the pair of end panels, and detaching the front panel from the back panel, the pair of end panels, and the frame. In addition, the back panel is detached from the front panel, the pair of end panels, and the frame, the pair of end panels are detached from the front panel, the back panel, and the frame. When the front panel, the back panel, and the pair of end panels are detached from the frame, the bottom panel is attached to the frame adjacent the secondary opening to block access to the frame interior through the secondary opening. The method includes moving the lid assembly to the open position, inserting the front panel, the back panel, and the pair of end panels into the frame interior through the frame opening, and moving the lid assembly to the closed position after the front panel, the back panel, and the pair of end panels are inside the frame interior.

Other aspects of the present disclosure will be apparent in view of the following description and claims.

BRIEF DESCRIPTION OF DRAWINGS

This disclosure includes non-limiting examples illustrated in the accompanying drawings.

Corresponding reference characters indicate corresponding parts throughout the drawings.

DETAILED DESCRIPTION

Figure 1:
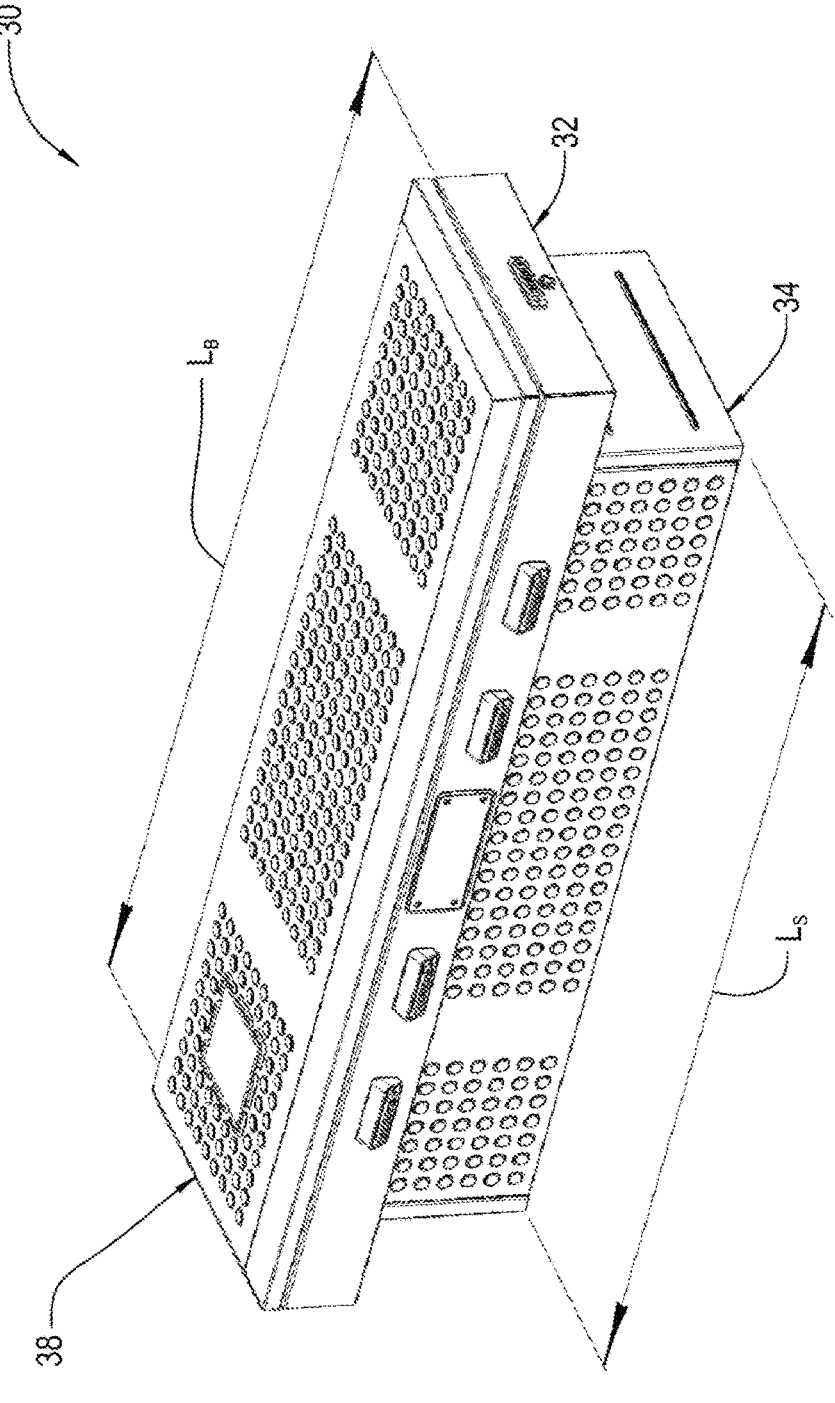
FIG. 1 is a perspective of a first example of a storage container having a closed lid assembly.

FIG. 1 illustrates a first example of a storage container designated in its entirety by the reference number 30. Although it is envisioned the storage container may have other configurations such as a toolbox, a jobsite box, deck box, or dock box, the exemplary storage container 30 is a truck box adapted for mounting at a forward end of a pickup truck cargo bed to hold equipment such as tools, supplies, sports equipment, and vehicle safety and maintenance items. Accordingly, inventive concepts and features disclosed herein are not intended to be limited to truck boxes. The illustrated truck box 30 is a crossbody truck box intended to extend from a first or driver side of the truck bed (not shown) to a second or passenger side of the truck bed opposite the first side. Moreover, the illustrated truck box 30 has a saddle configuration, generally comprising an upper bridge housing (generally designated by 32) and a lower saddle housing (generally designated by 34) positioned below the upper bridge housing. As will be appreciated, the upper bridge housing 32 and lower saddle housing 34 collectively constitute a tub of the container 30. The upper bridge housing 32 has a bridge length $L_B$, and the lower saddle housing 34 has a saddle length $L_S$ that is shorter than the bridge length. As will be appreciated, the bridge length $L_B$ is sized for spanning the opposite side walls, so the housing rests on top of the side walls. The saddle length $L_S$ is sized for receipt between opposite side walls of the truck cargo bed. In addition to allowing the storage container 30 to be anchored to the side walls, the saddle configuration allows equipment to be positioned lower in the truck.

Figure 2:
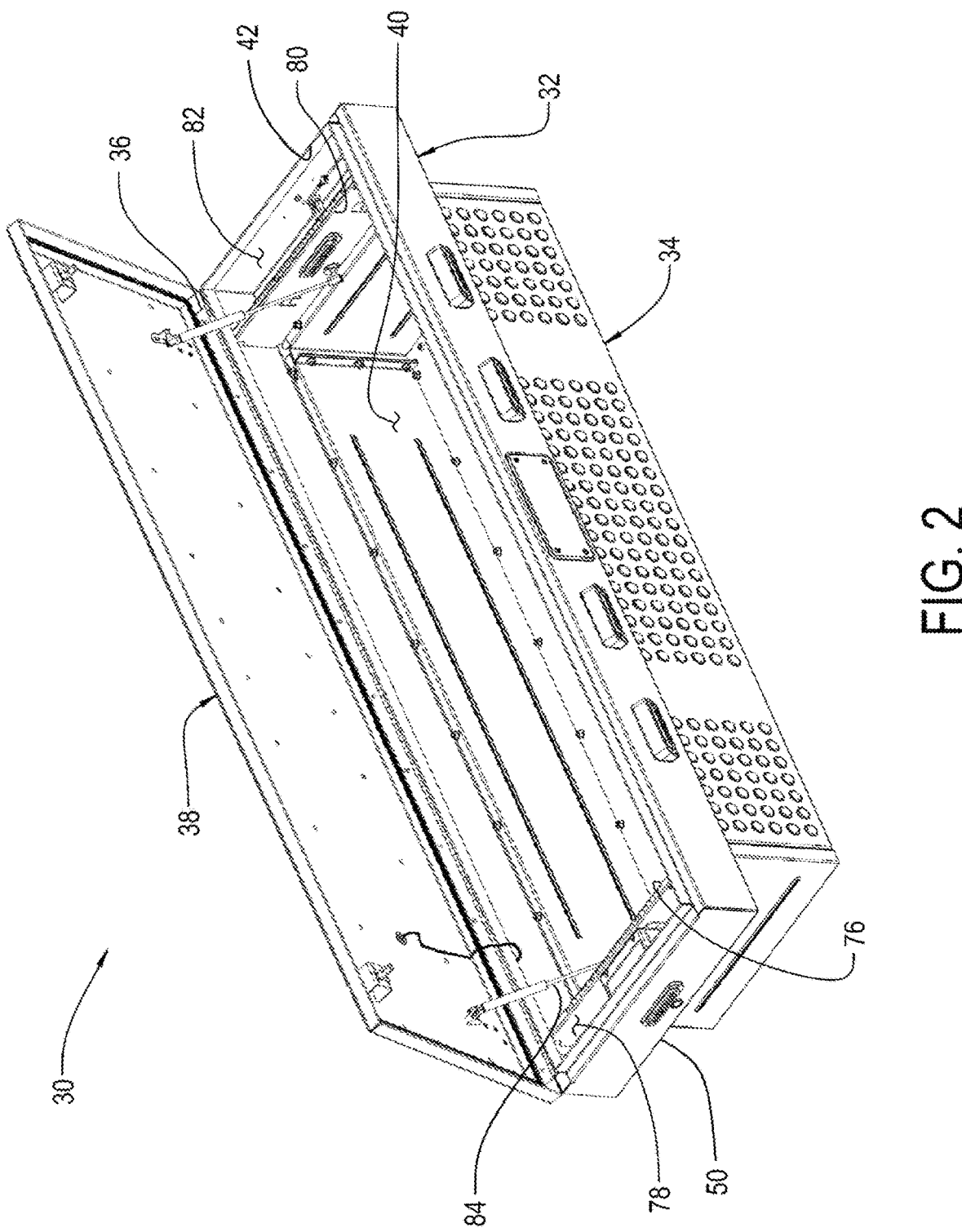
FIG. 2 is another perspective of the first example having an open lid assembly.
Figure 3:
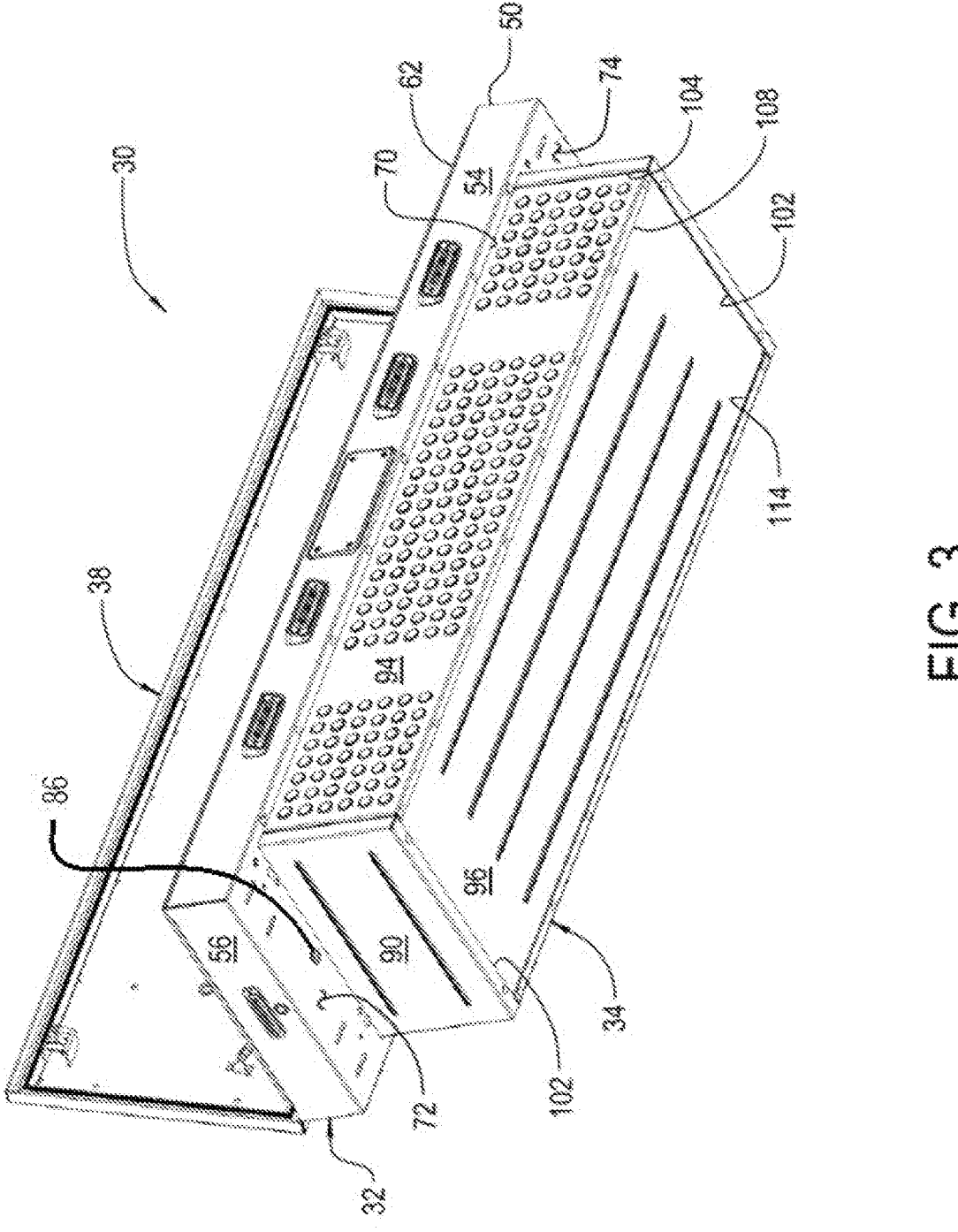
FIG. 3 is yet another perspective of the first example having an open lid assembly.
Figure 4:
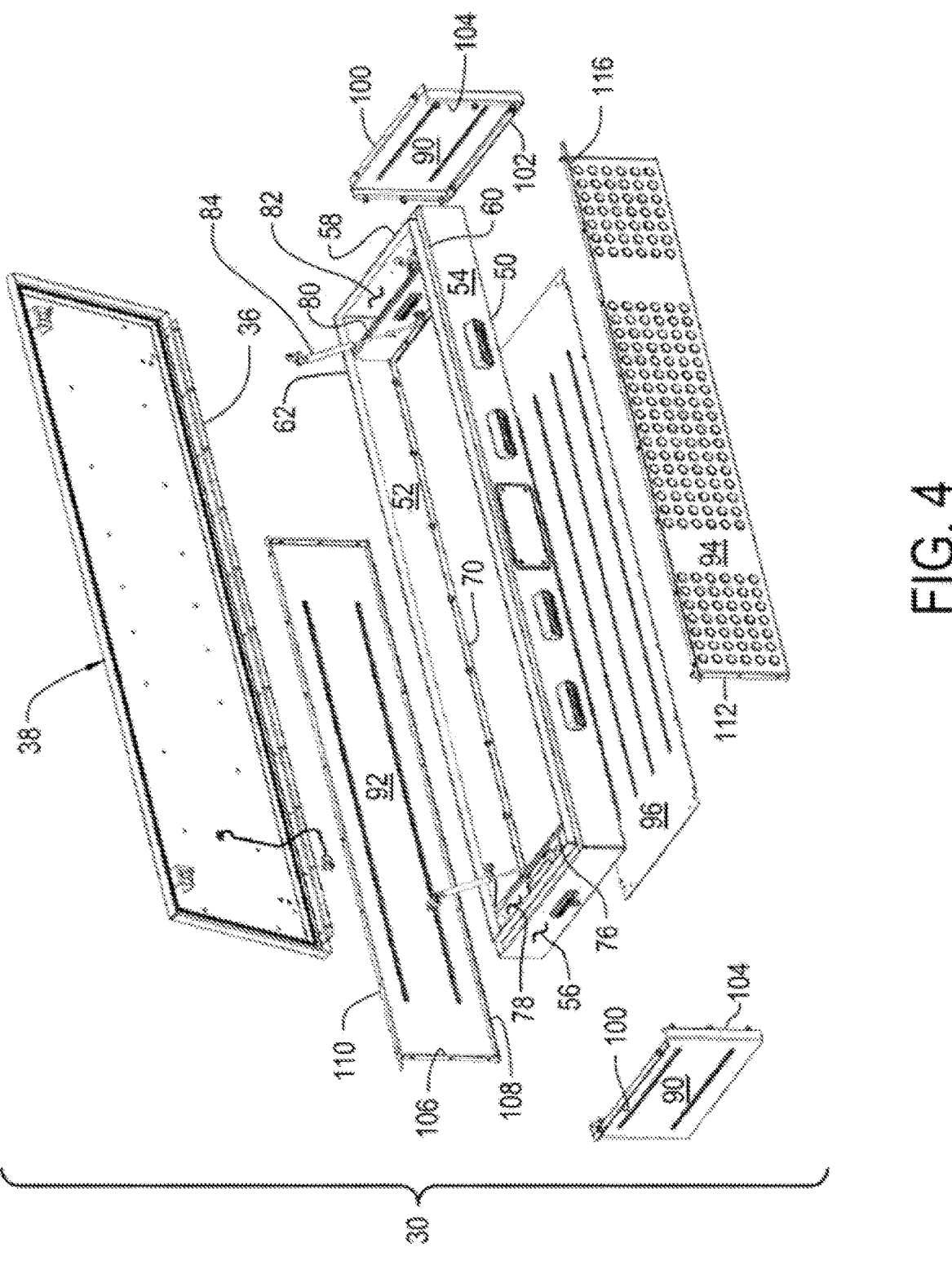
FIG. 4 is a partially separated perspective of the first example of the storage container.

As shown in FIG. 2, a hinge 36 pivotally connects a lid or cover assembly, generally designated by 38, to the upper bridge housing 32 for selectively covering a continuous hollow interior 40 of the container, extending downward from a container opening 42, through the bridge housing, to the lower saddle housing 34. As shown in FIGS. 2-4, the upper bridge housing 32 includes a generally open rectangular frame 50 having a hinge-side or cab-side wall 52, a jamb-side or bed-side wall 54, a driver-side wall 56, and a passenger-side wall 58. An upper sealing land 60 extends inward from the walls 52-58 to a vertical rim 62 extending upward from the sealing land and defining the container opening 42. Both the cab-side wall 52 and the bed-side wall 54 have an inwardly projecting lower flange 70. A wide driver-side mounting land 72 extends inward below the driver-side wall 56, and a wide passenger-side mounting land 74 extends inward below the passenger-side wall 58. Although the components of the upper bridge housing described above may be assembled using other means, the illustrated bridge housing 32 is assembled by welding the walls 52-58 and the landings 72, 74 together as shown. As will be appreciated, weld lengths of the bridge housing 32 are substantially shorter than those of conventional welded truck boxes. A driver-side divider or bulkhead 76 mounted on an inner margin of the driver-side mounting land 72 partially defines a driver-side compartment 78. A passenger-side divider or bulkhead 80 mounted on an inner margin of the passenger-side mounting land 74 partially defines a passenger-side compartment 82. A gas spring 84 extends from each of the bulkheads 76, 80 to the lid assembly 38 to bias the lid assembly toward its open position as shown in FIG. 2. The gas springs 84 are sized to lift the lid assembly 38 from its closed position as shown in FIG. 1 to the open position and hold the lid assembly in the open position. An auxiliary power port 86 having a grommet to prevent chafing and prevent water infiltration is provided in the driver-side mounting land 72 as shown in FIG. 3.

As further shown in FIGS. 3 & 4, the lower saddle housing 34 comprises opposite side panels 90, a hinge-side or cab-side panel 92, a jamb-side or bed-side panel 94, and a bottom panel 96. Each side panel 90 includes an outwardly extending upper flange 100, an inwardly extending lower flange 102, and an inward facing side rails 104. The hinge-side or cab-side panel 92 includes inwardly extending side flanges 106, an inwardly extending lower flange 108, and an outwardly extending upper flange 110. The jamb-side or bed-side panel 94 includes inwardly extending side flanges 112, an inwardly extending lower flange 114, and an outwardly extending upper flange 116. The components of the lower saddle housing 36 are assembled using conventional fasteners. In the illustrated example, nut plates are provided on side rails 104, permitting screw fasteners to be used to assemble the opposite side panels 70, the front panel 72, and the back panel 74 to each other before lowering the bottom panel 76 into position and attaching it to the other panels. Although the bottom panel 76 may be attached to the panels using other means, carriage bolts and nuts are used to attach these components in the illustrated example. In some examples, the nuts may be lock nuts, or lock washers may be used adjacent the nuts. Once the lower saddle housing 34 is assembled, the upper bridge housing 32 is lowered onto the lower saddle housing and joined with fasteners. Interfaces between the components of the upper housing and lower housing may be sealed with gaskets or sealant during assembly to provide watertight joints. These assembly steps may be performed by an end user after the container is transported from the manufacturer to the end user.

Figure 5:
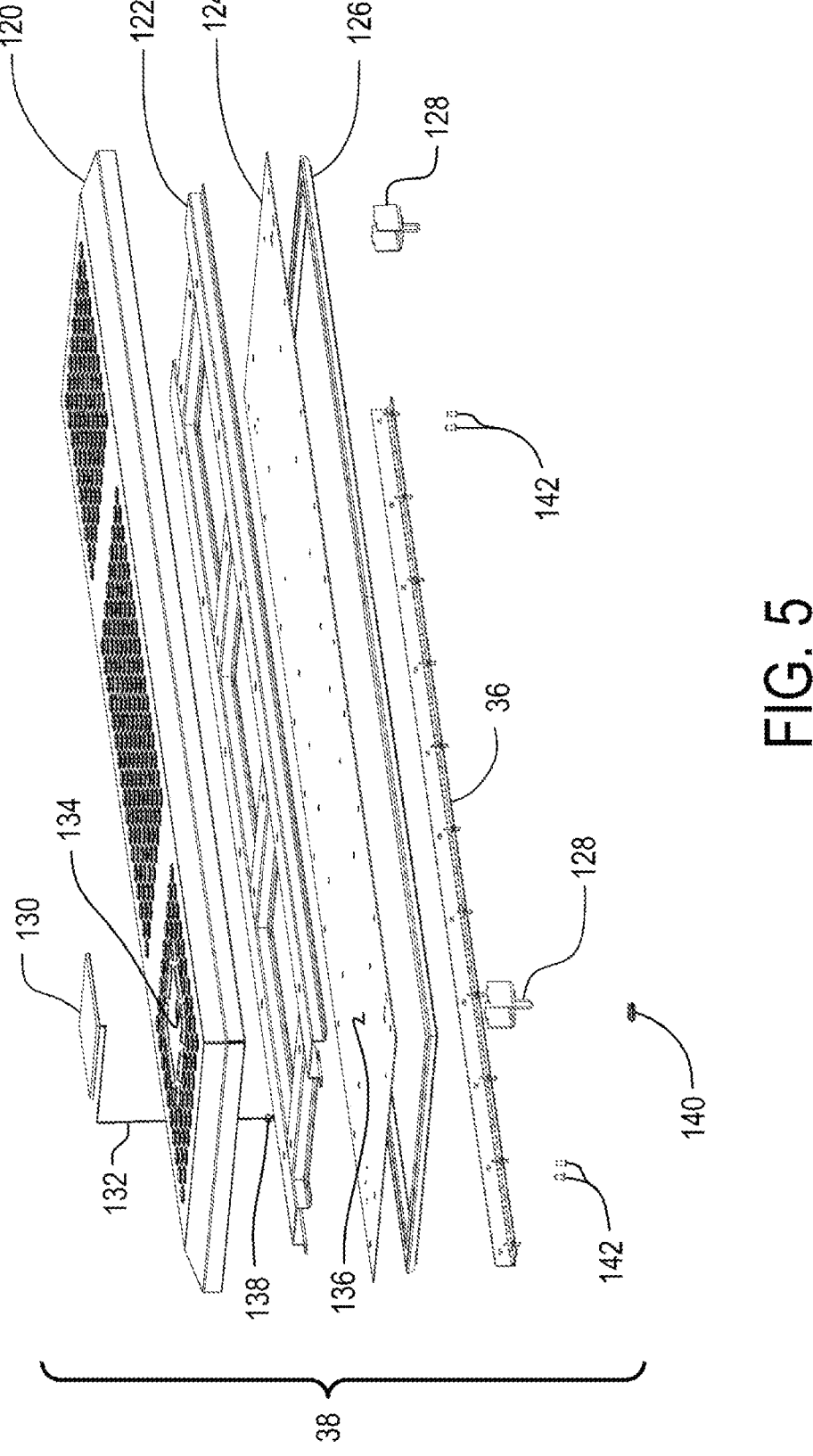
FIG. 5 is a separated perspective of the lid assembly of the first example.
Figure 6:
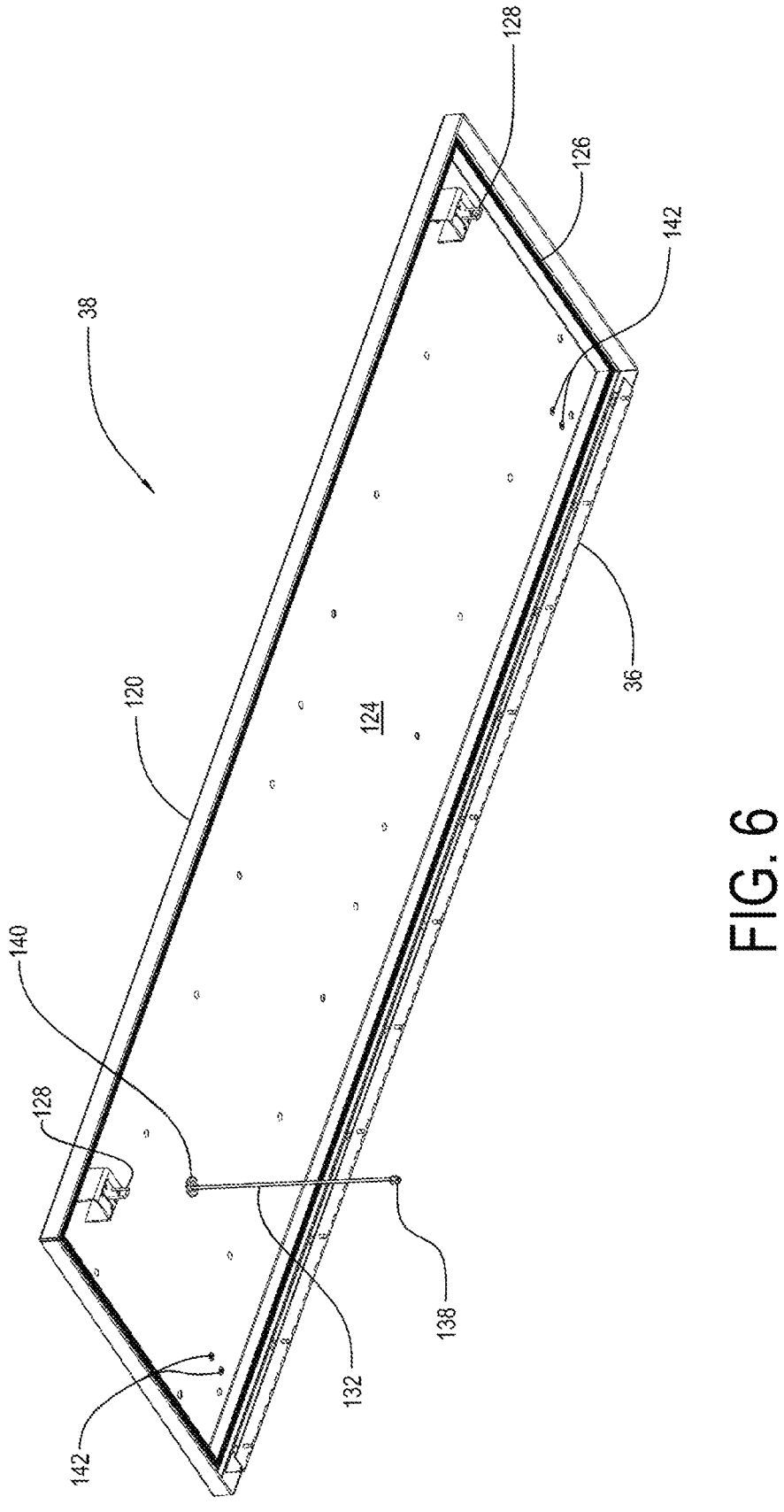
FIG. 6 is an assembled perspective of the lid assembly of FIG. 5.

FIG. 5 illustrates a separated lid assembly 38, including a shell 120, a frame 122, and an inside panel 124. As further shown in FIGS. 5 & 6, a gasket seal 126 is mounted around a peripheral margin of the inside panel 124. Although other means may be used, the illustrated seal 126 is attached to the inside panel 124 using a suitable weather-resistant adhesive. As will be appreciated, when the lid assembly 38 is lowered to its closed position, the gasket seal 126 engages the upper sealing land 60 of the upper bridge housing 32. The seal 126 and vertical rim 62 of the bridge housing 32 prevent precipitation from entering the hollow interior 40 of the container 30. Striker elements 128 are attached to the inside panel 124 as shown in FIG. 5. Although other means may be used to join the shell 120, frame 122, inside panel 124, and striker elements 128, the components of the illustrated example are joined by welding (e.g., spot welding). The hinge 36 is attached to the lid assembly 38 and the upper bridge frame 50 using rivets in the illustrated example. A solar cell panel 130 is attached to an exterior face of the shell 120 using a suitable weather-resistant adhesive. The solar panel 130 includes an electrical lead 132 that passes through openings 134, 136 in the shell 120 and inside panel 124, respectively, to a conventional connector 138. An elastomeric grommet 140 is inserted in the opening 136 of the inside panel 124 for appearance and to prevent the lead 132 from being abraded during transport and use. As will be appreciated, the solar cell panel 130 and corresponding provisions on the lid assembly 38 may be omitted in some examples. A pair of rivet nuts 142 are provided adjacent each end of the inside panel 124 as shown for receiving screw fasteners to attach corresponding upper ends of the gas springs 84 to the lid assembly 38. The components of the illustrated upper housing 32, the lower housing 34, and the lid assembly 38 are formed from metal sheet using conventional manufacturing techniques. The components may also have various surface treatments or coatings to enhance finish durability. Examples of such coatings include paint, clear coats, powder coats, PVC dipping, and anodized finishes.

Figure 7:
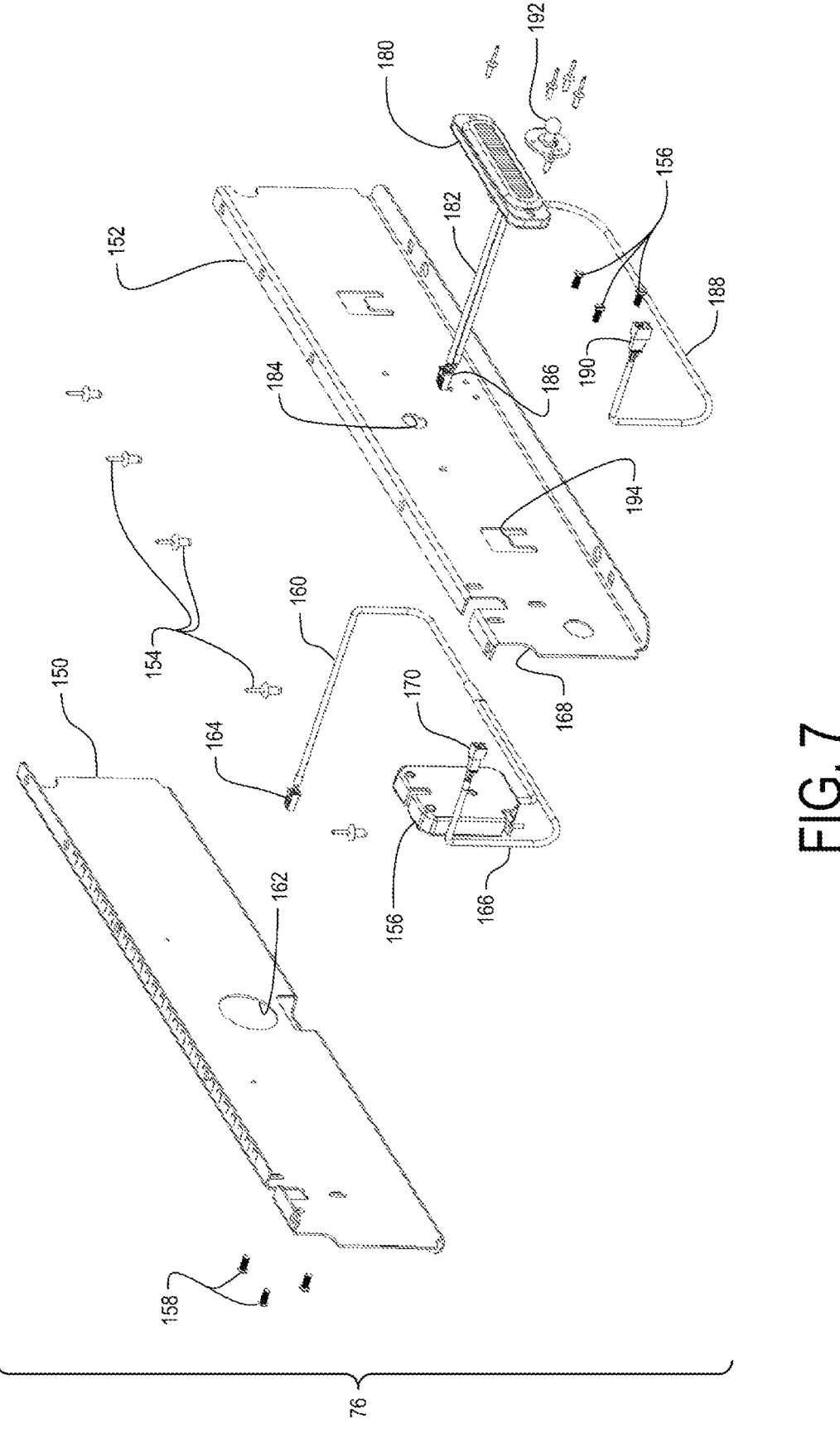
FIG. 7 is a separated perspective of the driver-side bulkhead of the first example.
Figure 8:
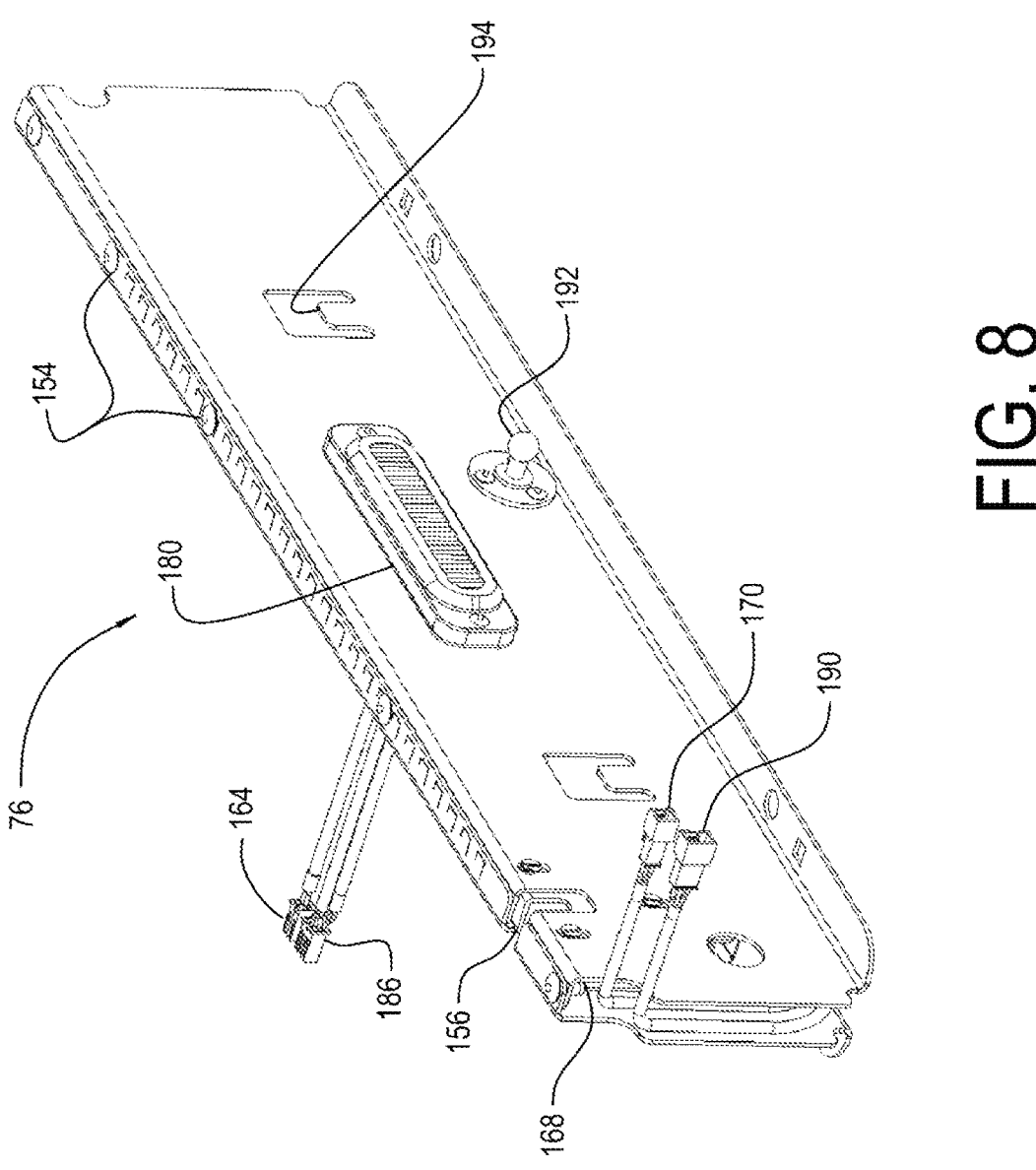
FIG. 8 is an assembled perspective of a driver-side bulkhead of FIG. 7.

FIGS. 7 & 8 illustrate components forming the driver-side bulkhead 76, including a compartment facia piece 150 and an interior facia piece 152 that are held together by rivets 154. An electric latch assembly 156 is positioned between the facia pieces 150, 152 and held in position by screw fasteners 158. An electrical lead 160, extending from the latch assembly 156, passes through a centrally located hole 162 in the compartment facia piece 150 to a power connector 164, and a jumper lead 166, extending from the latch assembly, passes through a jamb-side corner notch 168 in the interior facia piece 152 to a jumper connector 170. As will be appreciated, the centrally located hole 162 positions the power connector 164 inside the driver-side compartment 78 once the bulkhead 76 is attached to the driver-side mounting land 72. Likewise, the jamb-side notch 168 positions the jumper connector 170 below the sealing land 60 when the bulkhead 76 is assembled to the mounting land 72. An interior light 180 is riveted to the interior facia piece 152 as shown. An electrical lead 182 extends from the light 180 through an opening 184 in the interior facia piece 152 and the hole 162 in the compartment facia piece 150 to a power connector 186. The light 180 also has a jumper lead 188 that extends through the corner notch 168 in the interior facia piece 152 to a jumper connector 190. In addition, a spherical connector element 192 is a riveted to the interior facia piece 152. The spherical connector element 192 is adapted to be attached to a lower end of the corresponding gas spring 84 as shown in FIG. 2. Tab openings 194 are formed in the interior facia piece 152 to permit users to hang items inside the interior 40 after the bulkhead 76 is assembled to the mounting land 72 using conventional fasteners. The tab openings 194 may also be used to remove bottle caps.

Figure 9:
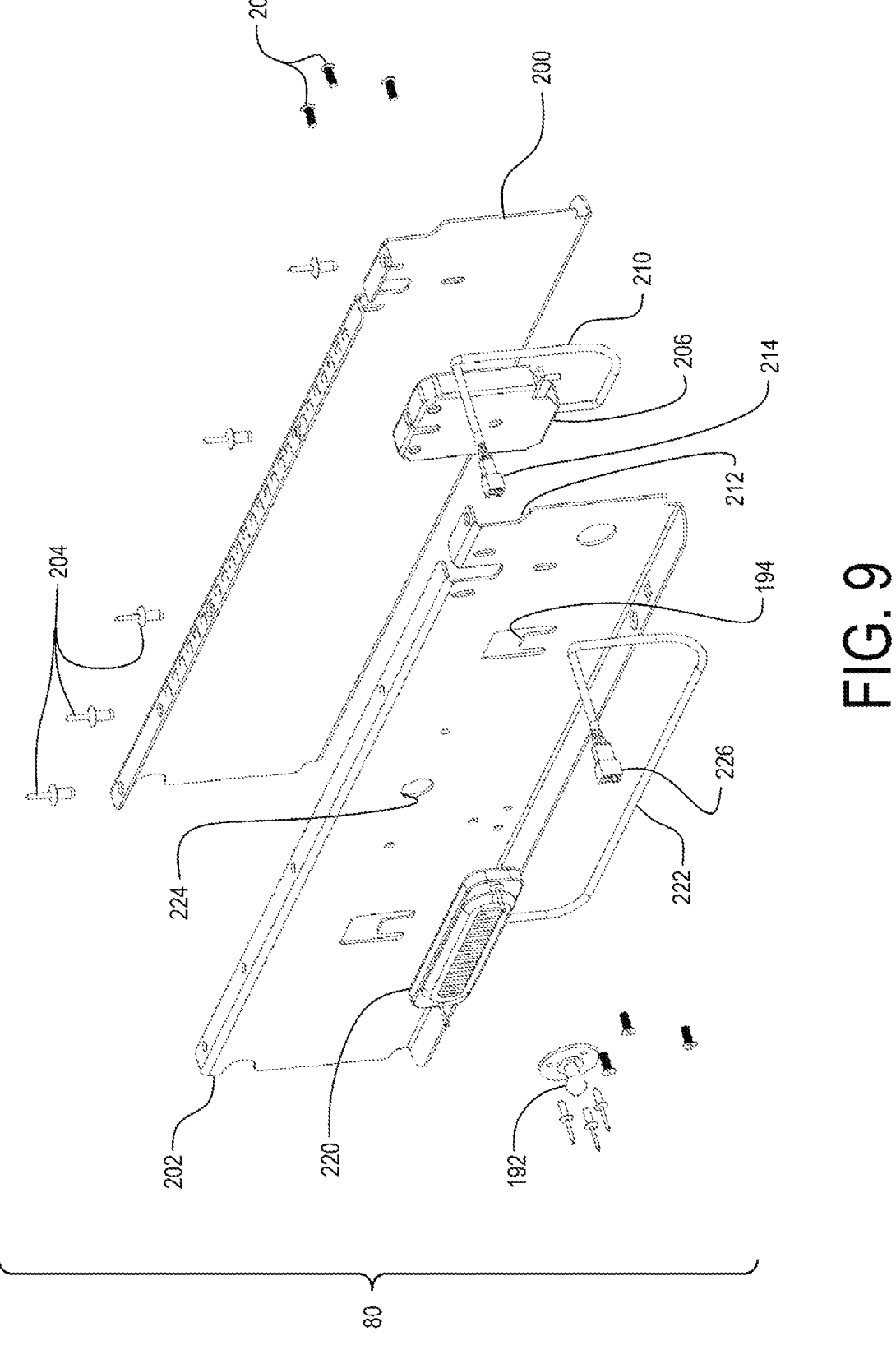
FIG. 9 is a separated perspective of the passenger-side bulkhead of the first example.
Figure 10:
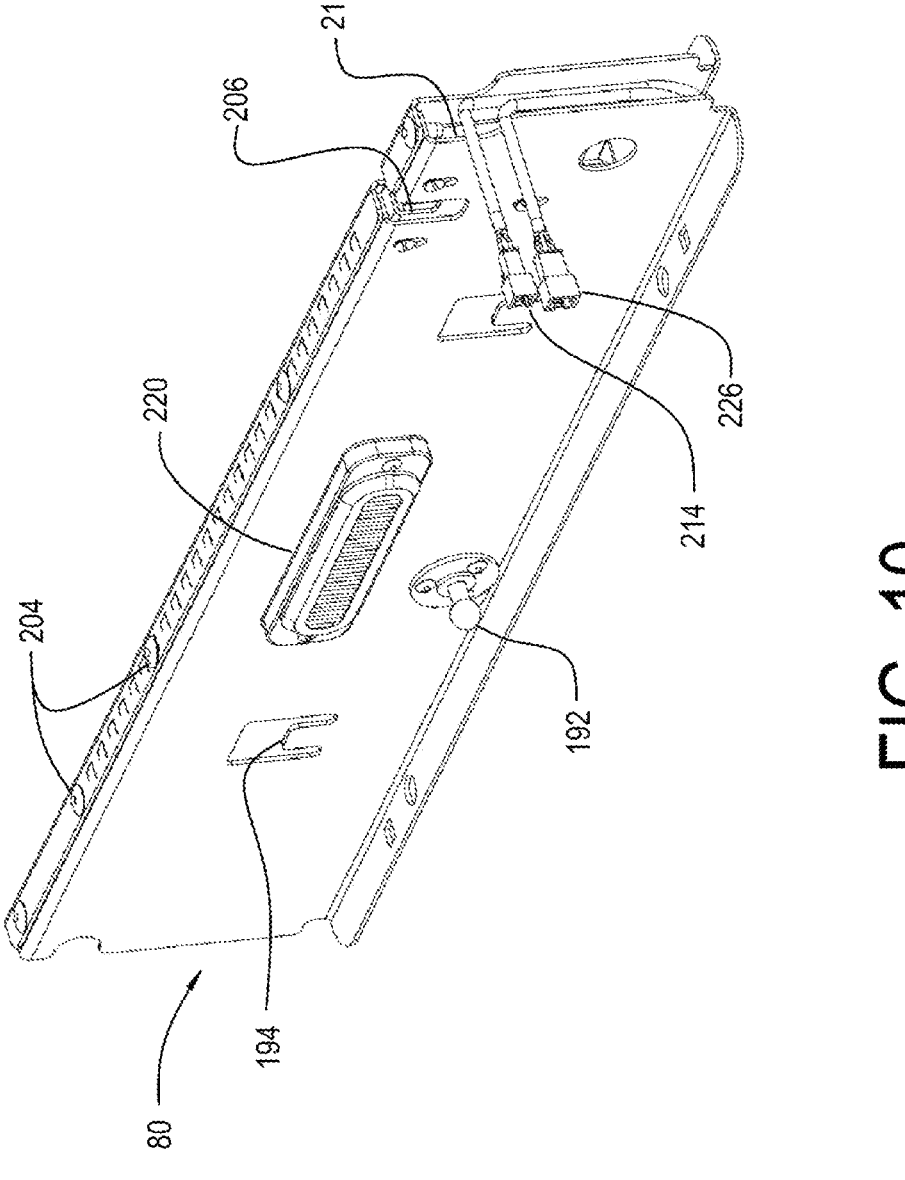
FIG. 10 is an assembled perspective of a passenger-side bulkhead of FIG. 9.

Components of the passenger-side bulkhead 80 are shown in FIGS. 9 & 10. The passenger-side bulkhead 80 includes a compartment facia piece 200 and an interior facia piece 202 that are held together by rivets 204. An electric latch assembly 206 is positioned between the facia pieces 200, 202 and held in position by screw fasteners 208. The latch assembly 206 is similar to the latch assembly 156 on the driver-side except that the passenger side assembly has only one electrical lead 210 that extends through a jamb-side corner notch 212 in the interior facia piece 202 to a connector 214. An interior light 220 is riveted to the interior facia piece 202 as shown. An electrical lead 222 extends from the light 220 through a hole 224 in the interior facia piece 202 and the corner notch 212 to a connector 224. Although other types of lights may be used, the illustrated interior lights 180, 220 are conventional LED lights. Like the passenger-side bulkhead 76, the driver-side bulkhead 80 has a spherical connector element 192 riveted to the interior facia piece 202 for attaching the corresponding gas spring 84, and tab openings 194 to hang items inside the interior 40.

Figure 11:
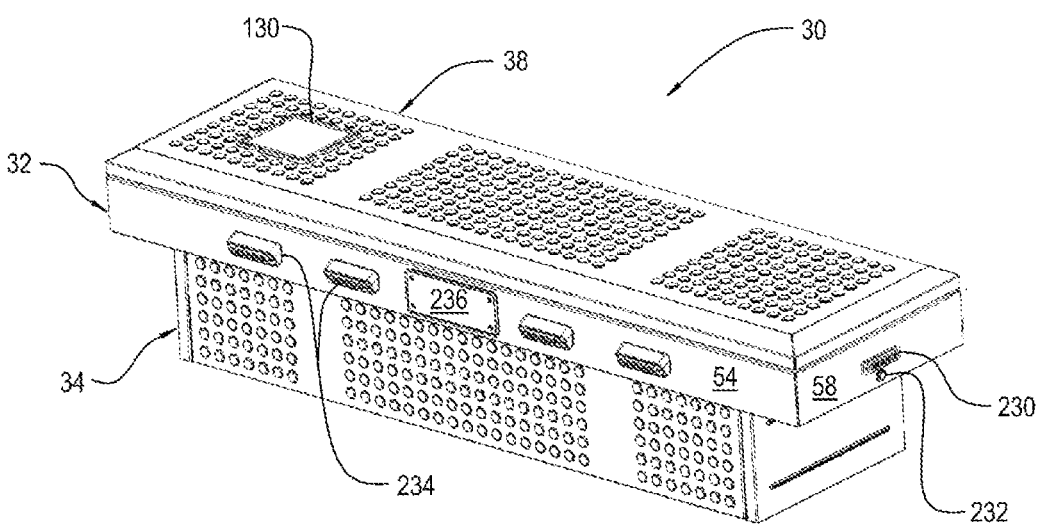
FIGS. 11 & 12 are perspectives of the storage container of the first example showing exterior features.
Figure 12:
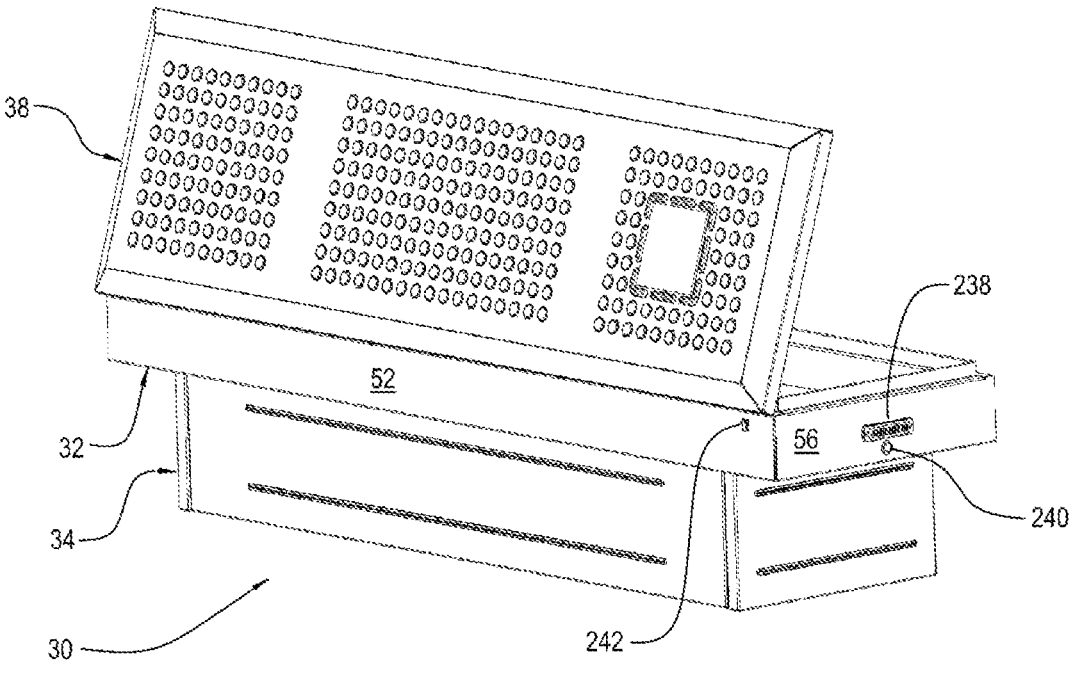

FIGS. 11 & 12 illustrate various components mounted on the exterior surfaces of the container 30. As shown in FIG. 11, a passenger-side courtesy light 230 is mounted on the passenger-side wall 58 of the upper bridge housing 32. A passenger-side lock actuation switch 232 is mounted on the passenger-side wall 58 immediately below the light 230. A series of bed lights 234 are mounted on the bed-side wall 54 of the upper bridge housing 32. The illustrated container 30 also includes an informational nameplate 236 mounted midway along the bed-side wall 54 with rivets. The nameplate 236 may include information such as retailer or manufacturer identifiers and trademarks, origin identification, and container weight limits. FIG. 12 shows a driver-side courtesy light 238 and a driver-side lock actuation switch 240 mounted on the driver-side wall 56. Although other types of lights may be used, the illustrated courtesy lights 230, 238 and bed lights 234 are conventional LED lights. The illustrated lock actuation switches 232, 240 are conventional capacitive buttons, but other types of switches may be used. As further shown in FIG. 12, a main power switch 242 is positioned on the cab-side wall 52 near the driver-side wall 56. It should be understood that the features (e.g., switches and lights) shown in FIGS. 11 & 12 may be positioned in different locations. Further, different numbers and spacings of lights are contemplated.

Figure 13:
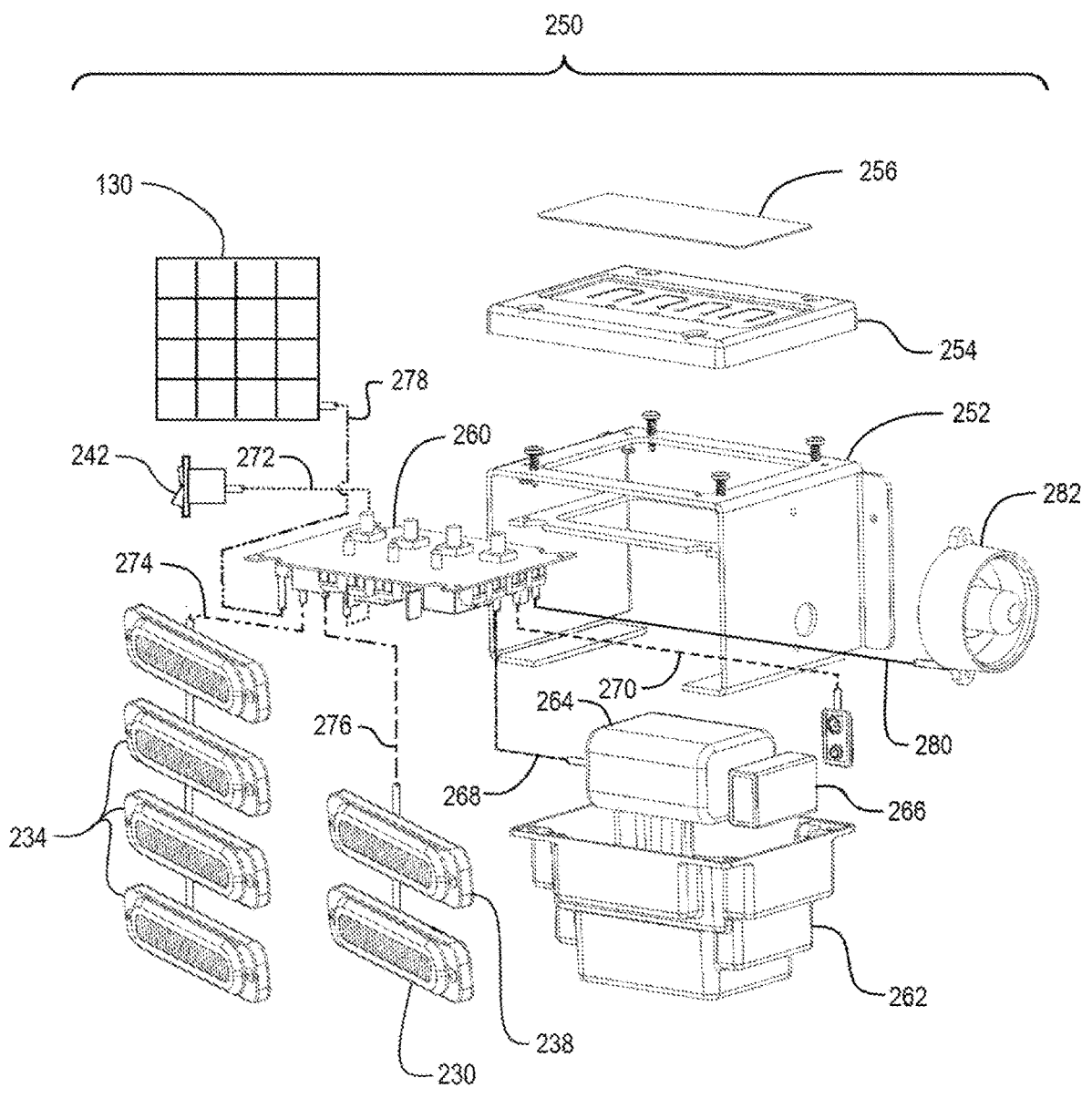
FIG. 13 is a fragmentary separated perspective of an electronics system of the storage container of the first example.

FIG. 13 illustrates an electronics system, generally designated by 250, partially housed in a control housing 252 mounted in the driver-side compartment 78. The control housing 252 includes a control panel 254 having a display cover 256. A printed circuit board (PCB) 260 is positioned in the control housing 252 immediately below the control panel 254, and a battery housing 262 (broadly, a power supply) is positioned in the control housing 250 below the PCB. The battery housing holds a primary battery 264 sized to power components of the electronics system 250 and the PCB 260. The primary battery 264 and a secondary battery 266 (broadly, a secondary power supply) are coupled to preselected terminals on the PCB 260 via leads 268, 270, respectively. It is envisioned that the batteries 264, 266 may be wrapped in insulation to reduce heat loss and protect the battery. The main power switch 242, which is mounted on the cab-side wall 252 of the upper bridge housing 32, is functionally connected to the primary battery 264 via lead 272 to selectively disconnect the battery to limit battery discharge when the storage container 30 is being shipped or the electronics system 250 is not in use. The series of bed lights 234 and the courtesy lights 230, 238 are connected to the PCB 262 by leads 274 and 276 as shown. The lock actuation buttons 232, 240 (not shown) are also connected to the PCB 262. Lead 278 connects the solar panel 130 to the PCB 262, and lead 280 connects the PCB to an alarm 282 mounted on the housing 252.

As will be appreciated, the primary battery 264 provides a small instrument voltage to the PCB 260 to power its circuitry, including relays for controlling operation of various electronics components by selectively supplying the components with power from the main battery. The PCB 260 directs energy from the solar panel 130 to the primary battery 264 for recharging. In the illustrated example, the solar panel 130 charges the primary battery 264 regardless of whether the main power switch 242 is in an on or off position. In an optional configuration, power is supplied to the PCB 260 from a power source mounted outside the storage container via a wiring harness (not shown) entering the storage container 30 through the auxiliary power port 86 located below the control housing 252. In some examples, the wiring harness may be operatively connected to a vehicle battery or an auxiliary battery mounted in the cab to supply power to the electronics system 250.

The PCB 260 supplies the latch assemblies 156, 206 with power from the main battery 264 in response to receiving a predetermined signal from a key fob transmitter (e.g., transmitting a radio signal), a cell phone (e.g., transmitting a Blu Tooth signal), or another conventional transmitter type positioned outside the storage container 30. When the PCB 260 directs power to the latch assemblies 156, 206, the assemblies release the corresponding striker elements 128, allowing the gas springs 84 to pivot the lid assembly 38 about the hinge 36 to its open position. The gas springs 84 are sized to lift the lid assembly 38 to the open position but allow a user to overcome its lifting force to manually pivot the lid assembly to its closed position. When a user pushes the lid assembly 38 to its closed position and the PCB 260 is not directing power to the latch assemblies 156, 206, the latch assemblies reengage with open striker elements 128 to lock the lid assembly in its closed position.

When the lid assembly 38 is in the open position, the control panel 254 is accessible from inside the cargo bed or outside the driver side of the bed to control components of the electronic system 250. The control panel 254 of the illustrated example includes selectors (e.g., sealed push buttons) allowing a user to select whether the bed lights 234 receive power, whether the courtesy lights 230, 238, receive power, and whether the interior lights 180, 220 receive power. Thus, a user can selectively turn the bed lights 234, the courtesy lights 230, 238, and the interior lights 180, 220 on and off using the control panel 254. In some examples having variable color or intensity lights, the color or intensity of light emitted from the lights may also be controlled from the control panel 254. It is envisioned that the PCB 260 may be programed to power selected lights upon receiving a signal from an external device as previously described.

In the illustrated example, a user may use the control panel 254 to select a convenience mode in which the PCB 260 directs power to the latch assemblies 156, 206, to open the lid assembly 38 when the user touches the passenger-side lock actuation switch 232 or the driver-side lock actuation switch 240. Thus, the PCB 260 may be set to a mode allowing the container 30 to be opened without an external transmitter. Further, the control panel 254 of the illustrated example permits the user to activate an alarm mode in which the PCB 260 directs power from the secondary battery 266 to the alarm 282 whenever the lid assembly 38 is opened to alert a user that the interior 40 of the container 30 is being accessed. As will be appreciated, the secondary battery 266 powers the alarm 292 and a portion of the PCB 260 controlling the alarm, so the alarm functions regardless of whether the main power switch 262 is in its on or off position. It is envisioned that the PCB 260 may include a timer circuit to control alarm duration. It is also envisioned that the PCB 260 may adapted to receive a signal from a wi-fi transmitter to switch between modes or to control the container electronics system 250 from a distant locale. In other examples, the control panel 254 and PCB 260 may be configured to selectively activate cooling fans or battery warmers (not shown). It envisioned the system 250 may include a thermostat element to control operation of the fan or warmer.

Figure 14:
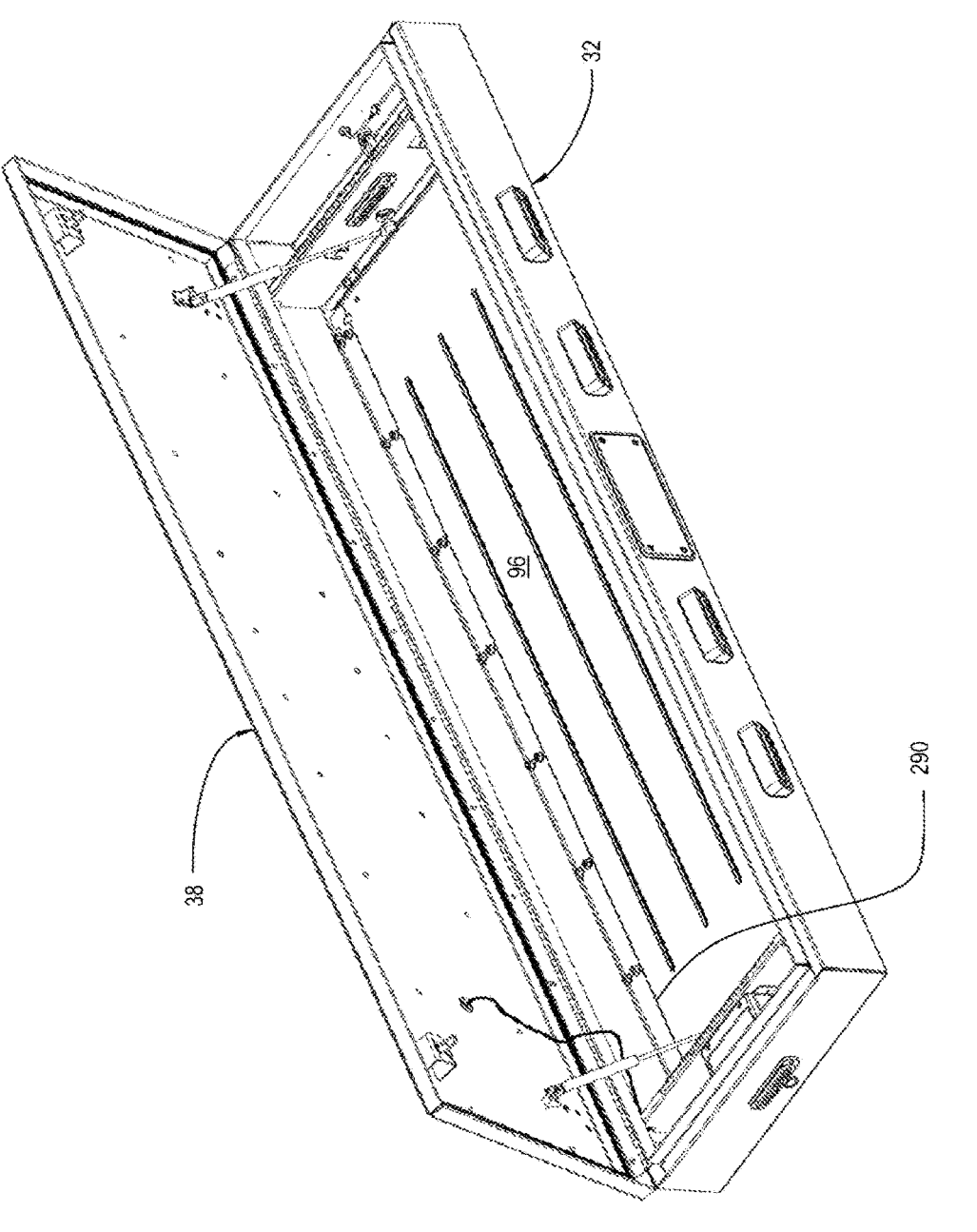
FIG. 14 is a perspective of an upper bridge housing, lid assembly, and bottom panel partially assembled for shipment.
Figure 15:
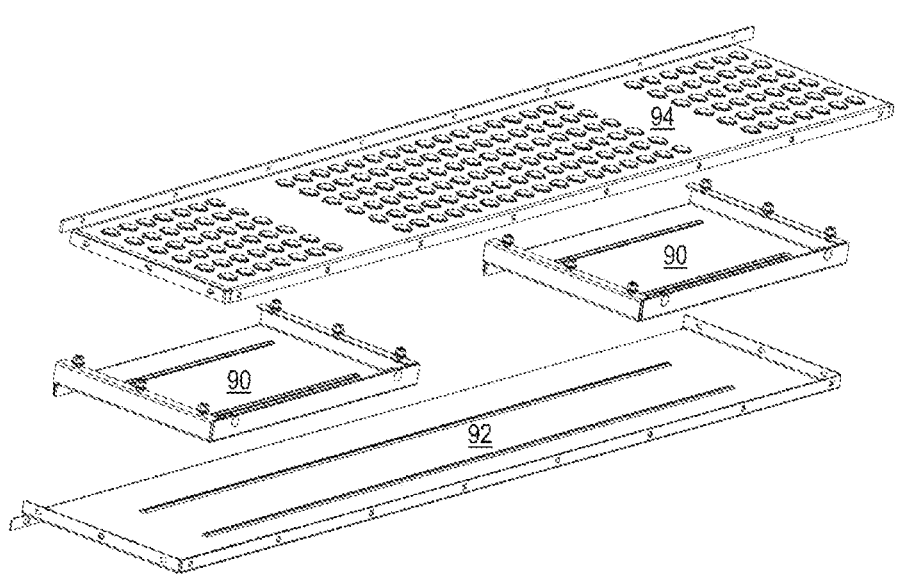
FIG. 15 is a separated perspective of opposite side panels, a cab-side panel, and a bed-side panel oriented in preparation for shipment.
Figure 16:
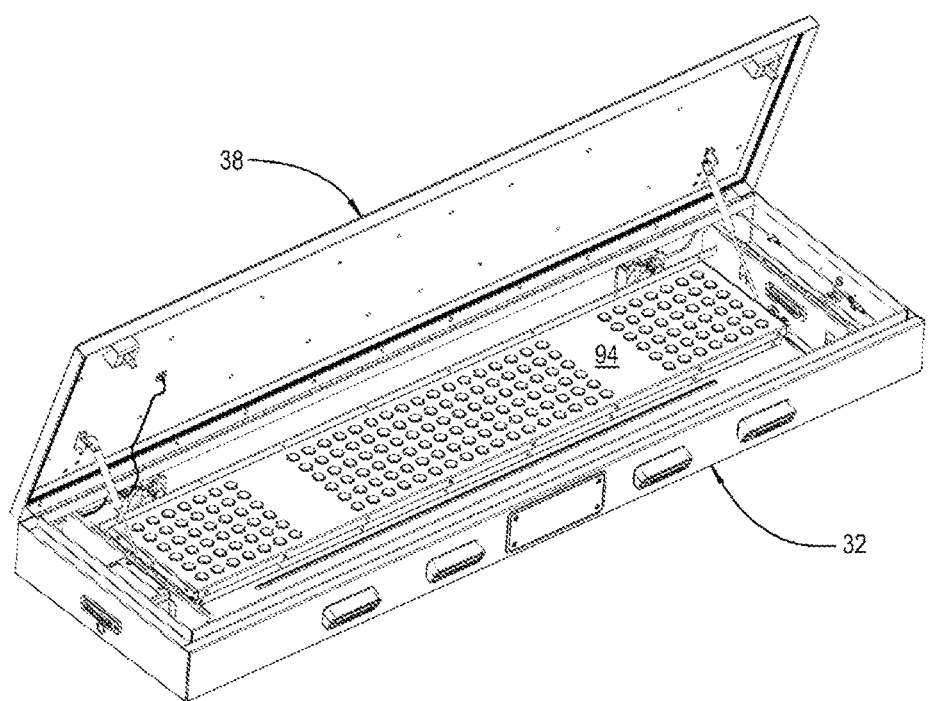
FIG. 16 is a perspective of the storage container of the first example assembled for shipment.
Figure 17:
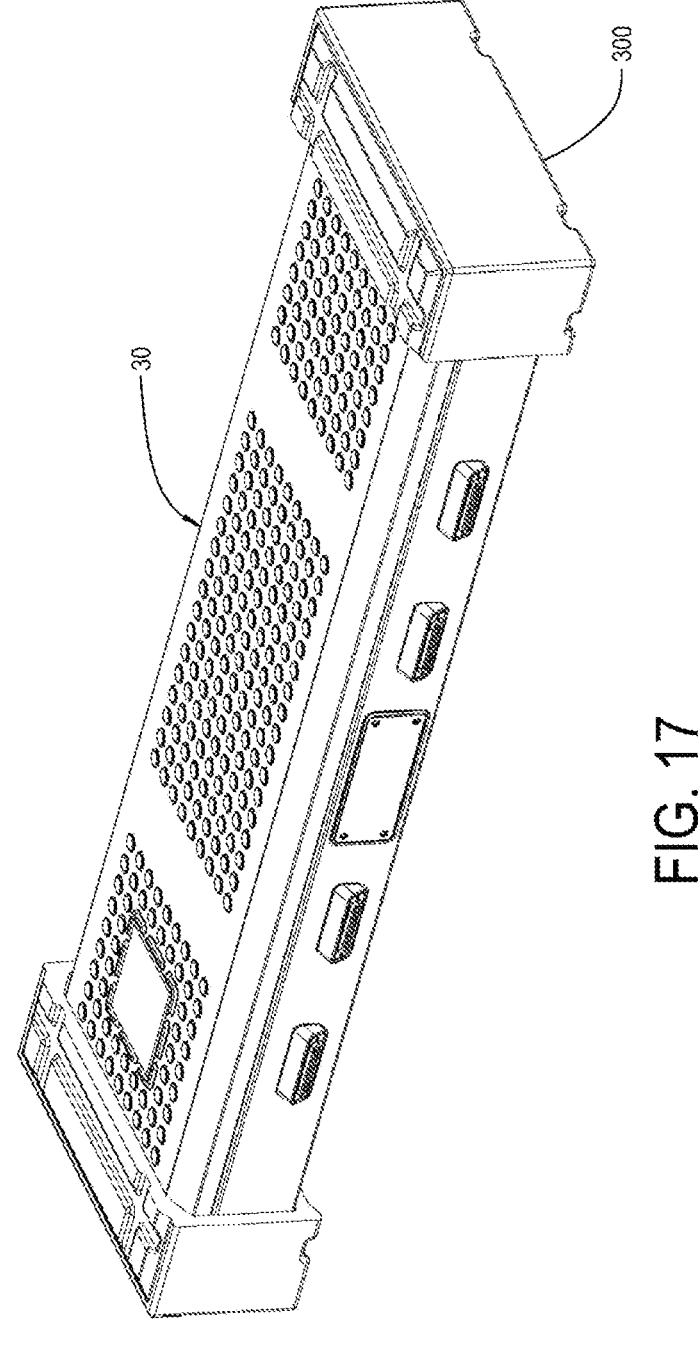
FIG. 17 is a perspective of the storage container similar to FIG. 16 including packaging.

After manufacturing structural components and assembling the electronics system 250, the storage container 30 is prepared for transport by attaching the bottom panel 96 of the lower saddle housing 34 to the lower flanges 70 of the upper bridge housing 32 using temporary transport strips 290 as illustrated in FIG. 14. Although other fasteners may be used, screw fasteners are used to connect the strips 290 to the longer margins of the bottom panel 96 and to the lower flanges 70. In the illustrated example, the end panels 90, cab-side panel 92, and bed-side panel 94 are oriented as shown in FIG. 15 and positioned on top of the bottom panel 96. Alternatively, the panels 90-94 are fastened together and to the bottom panel 96 using screw fasteners, zip ties, straps, tape, or other means. Further, in other examples, packaging such as paper, cardboard, molded foam elements may be used to maintain the positions of the elements and prevent damage during transport. Although the bottom panel 96 is described as being attached to the upper bridge housing 32 before the other panels are positioned in the housing, it is envisioned all of the panels may be attached to each other and to the transport strips 290 before being lowered into the upper bridge housing 32 and attached to the flanges 70 of the upper bridge housing. After all of the structure elements are assembled as shown in FIG. 16 and any additional fastener elements and instructions are positioned in the upper bridge housing 32, the lid assembly 38 is pivoted to its closed position and molded foam elements 300 are positioned over opposite ends of the bridge housing as shown in FIG. 17. Although it is envisioned that the bridge assembly and foam elements may be sealed in a cardboard box or connected with straps, the bridge housing and foam elements 300 are enclosed shrink wrap in the illustrated example.

Figure 18:
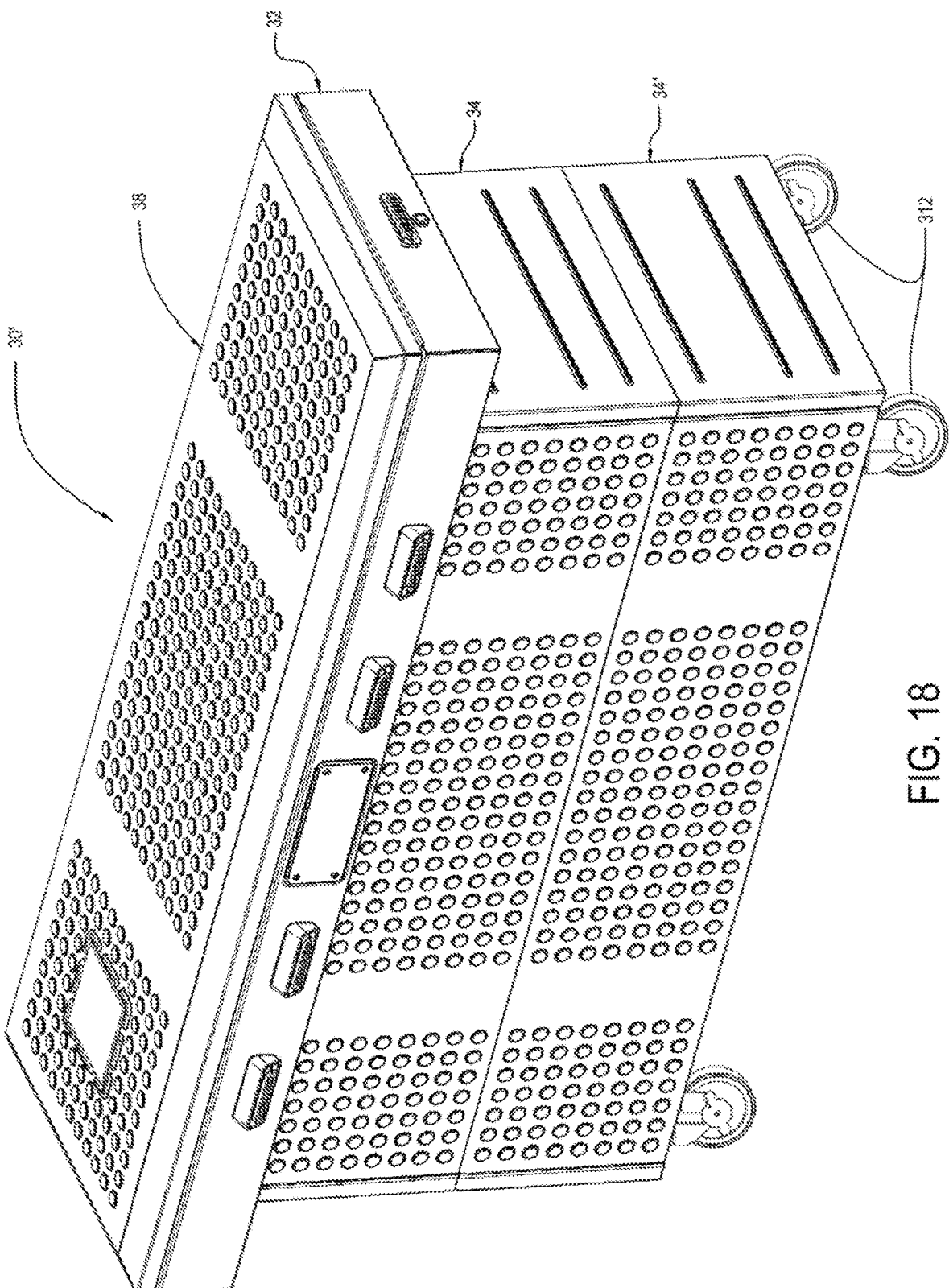
FIG. 18 is a perspective of a first example of a storage container having a closed lid assembly.

FIG. 18 illustrates a second example of a storage container 30'. The container 30' is similar to the container of the first example except the lower saddle housing 34' comprises a second set of panels that are similar to those of the first set of panels (i.e., the end panels 90, cab-side panel 92, and bed-side panel 94) except they are configured to connect to the first set of panels as shown. The bottom panel 96 is omitted from the first or upper set of panels creating a taller hollow interior than the first example. The container 30' also has casters 312 mounted on the bottom panel 96, allowing for the container to be easily moved. The storage container 30' may be well suited for use on a jobsite. Alternatively, the casters 312 may be omitted to optimize the container 30' for storage on a deck, a dock, or a boat.

The containers 30, 30' described above have several advantages. The containers have a shipping configuration as shown in FIG. 17 that has a substantially smaller volume than that of conventional storage containers, allowing less packaging to be used, and resulting in lower shipping costs, smaller warehousing, stocking, and retail space requirements, and providing a transport size that is more manageable for retail personnel and end users. The containers use electronic latch assemblies that enable remote opening and feature operational modes in which the latch assemblies can be opened by selectively pushing a button on the container. Thus, the containers may be unlocked and opened without using a key. The containers have multiple lights for illuminating the container interior, as well as areas adjacent the ends and jamb side of the container. Further, the containers include a solar panel 130 for charging the primary battery used to power the electronic components, as well as the secondary battery used to power the PCB. The containers include an alarm 282 for alerting a user to unauthorized access, potentially preventing theft. In addition, the container provides a platform for additional electronic components, including cooling fans and battery warmers, to further improve user convenience. And lastly, the containers include a main power switch, allowing the electronics system to be shut down when not being used to conserve battery power.

When introducing elements in this description and the claims, the articles "a", "an", "the", and "said" are intended to indicate one or more of the elements. The terms "comprising", "including", and "having" are intended to be inclusive and indicate there may be additional elements other than the listed elements.

As those skilled in the art could make various changes to the above constructions, products, and methods without departing from the intended scope of the description, all matter in the above description and accompanying drawings should be interpreted as illustrative and not in a limiting sense. The patentable scope of the disclosure is defined by the claims, and can include other constructions and methods that would occur to those skilled in the art. Such other constructions are intended to be within the scope of the claims if the structural elements of the constructions do not differ from the literal language of the claims, or if the constructions include equivalent structural elements having insubstantial differences from the literal languages of the claims.

To the extent that the specification, including the claims and accompanying drawings, discloses any additional subject matter that is not within the scope of the claims below, the disclosures are not dedicated to the public and the right to file one or more applications to claims such additional disclosures is reserved.

The invention claimed is:

1. A storage container for storing equipment, comprising:
   a frame surrounding a frame interior, said frame having a primary opening providing access to the frame interior and a secondary opening opposite the primary opening, the primary opening having a primary opening length and a primary opening width;
   a lid assembly pivotally mounted on the frame adjacent to the primary opening for selective movement between a closed position in which the lid assembly covers the primary opening to block access to the frame interior through the primary opening and an open position in which at least a portion of the lid assembly is separated from the frame allowing access to the frame interior through the primary opening;
   a bottom panel configured for selective attachment to the frame adjacent to the secondary opening to block access to the frame interior through the secondary opening, said bottom panel having a bottom panel length and a bottom panel width;
   a front panel having a front panel length corresponding to the bottom panel length and a front panel width measuring less than the primary opening width;
   a back panel having a back panel length corresponding to the bottom panel length and a back panel width corresponding to the front panel width; and
   a pair of end panels, each end panel of said pair of end panels having an end panel length corresponding to the bottom panel width and an end panel width corresponding to the front panel width;
   wherein:
      the frame interior is sized to simultaneously receive the front panel, the back panel, and the pair of end panels;
      the front panel, the back panel and the pair of end panels are configured for selective attachment to the frame surrounding the secondary opening when the bottom panel is detached from the frame such that a first end panel of the pair of end panels is simultaneously attached to the frame adjacent to a first end of the secondary opening, to a first end of the front panel, and to a first end of the back panel and a second end panel of the pair of end panels is simultaneously attached to the frame adjacent to a second end of the secondary opening opposite said first end of the secondary opening, a second end of the front panel opposite said first end of the front panel, and a second end of the back panel opposite the first end of the back panel;
      the bottom panel is configured for simultaneous selective attachment to the front panel, the back panel, and the pair of end panels opposite the secondary opening when the front panel, the back panel, and the pair of end panels are attached to the frame surrounding the secondary opening; and
      the front panel, the back panel, the pair of end panels, and the bottom panel define a second interior extending continuously from the frame interior when the front panel, the back panel, and the pair of end panels are attached to the frame surrounding the secondary opening.

2. A storage container as set forth in claim 1, wherein:
   said front panel is a first front panel;
   said back panel is a first back panel;
   said pair of end panels is a first pair of end panels; and
   the storage container further comprises:
      a second front panel configured for selective attachment to the first front panel opposite the secondary opening when the bottom panel is detached from the frame and the first front panel;
      a second back panel configured for selective attachment to the first back panel opposite the secondary opening when the bottom panel is detached from the frame and the first back panel;
      a second pair of end panels, each second end panel of said pair of second end panels being configured for selective simultaneous attachment to a corresponding first end panel of said first pair of end panels, to the second front panel, and to the second back panel; and the bottom panel is configured for simultaneous selective attachment to the second front panel, the second back panel and the second pair of end panels opposite the secondary opening when the first front panel, the first back panel, and the first pair of end panels are attached to the frame surrounding the secondary opening.

3. A storage container for storing equipment as set forth in claim 1, further comprising:
a striker mounted on the lid assembly;
an electric latch assembly mounted on the frame for engaging the striker to hold the lid assembly in the closed position;
a power supply positioned in the frame interior; and
a control mounted inside the frame and operatively connecting the power supply and the electric latch assembly for selectively disengaging the striker to allow the lid assembly to move to the open posit ion when the control receives a signal from a preselected transmitter located outside the storage container.

4. A storage container as set forth in claim 3, wherein the lid assembly is biased toward the open position, so the lid assembly moves to the open position when the electric latch assembly disengages the striker.

5. A storage container as set forth in claim 4, further comprising a gas spring connected to the lid assembly to bias the lid assembly toward the open position.

6. A storage container as set forth in claim 5, further comprising a bulkhead spanning the hollow frame interior, wherein the gas spring and the electric latch assembly are mounted on the bulkhead.

7. A storage container as set forth in claim 6, wherein:
the bulkhead includes an interior space; and
the electric latch assembly is positioned inside the interior space of the bulkhead.

8. A storage container as set forth in claim 6, further comprising an interior light assembly mounted on the bulkhead for selectively illuminating the frame interior.

9. A storage container as set forth in claim 6, wherein the bulkhead includes a bottle opener.

10. A storage container as set forth in claim 3, further comprising a switch mounted on at least one of the frame and the lid assembly operatively connected to the electric latch assembly, so the electric latch assembly disengages the striker when a user actuates the switch.

11. A storage container as set forth in claim 10, wherein the control selectively controls whether the electric latch assembly disengages the striker when the user actuates the switch.

12. A storage container as set forth in claim 11, wherein the switch comprises a capacitive touch button mounted on the frame.

13. A storage container as set forth in claim 3, further comprising a solar cell panel mounted on the lid assembly and operatively connected to the power supply for recharging the power supply.

14. A storage container as set forth in claim 3, further comprising:

an interior light assembly mounted inside the frame for selectively illuminating the frame interior;
an exterior light assembly mounted outside the frame for selectively illuminating an area outside the storage container; and
the control selectively controls whether the interior light assembly receives power from the power supply to illuminate the frame, the exterior light assembly receives power from the power supply to illuminate the area outside the storage container, both the interior light assembly and the exterior light assembly receive power from the power supply.

15. A storage container as set forth in claim 3, wherein:
said power supply is a first power supply; and
the storage container further comprises:
a second power supply;
a proximity sensor mounted adjacent to the primary opening of the frame; and
an alarm mounted on the frame; and
wherein the control is operatively connected between the second power supply and the alarm for energizing the alarm when the control receives a signal from the proximity sensor.

16. A storage container as set forth in claim 15, further comprising a main power switch mounted on the frame for selectively disconnecting the first power supply from the control without disconnecting the second power supply from the control.

17. A storage container as set forth in claim 3, wherein the control includes a relay that directs power from the power supply to the electric latch assembly to disengage the striker.

18. A storage container as set forth in claim 3, wherein:
said power supply is a battery; and
the storage container includes means for optionally connecting an external power supply to the control for powering the electric latch assembly for selectively disengaging the striker to allow the lid assembly to move to the open position without power from the battery.

19. A storage container for storing equipment as set forth in claim 1, wherein:
the frame includes a sealing land surrounding the primary opening;
said lid assembly further comprises:
a support frame;
a cover mounted on the support frame;
an inside panel mounted on the support frame opposite the cover;
a striker mounted on the inside panel; and
a seal gasket mounted on a peripheral margin of the inside panel adapted for engaging the sealing land surrounding the primary opening to prevent liquid from passing between the lid assembly and the frame when the lid assembly is in the closed position; and
an electric latch assembly mounted on the frame for engaging the striker to hold the lid assembly in the closed position;
a control mounted inside the frame operatively connecting the electric latch assembly to a power supply for selectively disengaging the striker to allow the lid assembly to move to the open position when the control receives a signal.

* * * * *